(12) United States Patent
Nigo et al.

(10) Patent No.: US 10,090,743 B2
(45) Date of Patent: Oct. 2, 2018

(54) EMBEDDED PERMANENT MAGNET-TYPE ELECTRIC MOTOR, COMPRESSOR, AND REFRIGERATION/AIR-CONDITIONING DEVICE

(71) Applicant: Mitsubishi Electric Corporation, Tokyo (JP)

(72) Inventors: Masahiro Nigo, Tokyo (JP); Kazuhiko Baba, Tokyo (JP); Kazuchika Tsuchida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/122,446

(22) PCT Filed: Apr. 16, 2015

(86) PCT No.: PCT/JP2015/061707
§ 371 (c)(1),
(2) Date: Aug. 30, 2016

(87) PCT Pub. No.: WO2015/163229
PCT Pub. Date: Oct. 29, 2015

(65) Prior Publication Data
US 2017/0110944 A1    Apr. 20, 2017

(30) Foreign Application Priority Data

Apr. 23, 2014 (JP) .................... PCT/JP2014/061370

(51) Int. Cl.
*H02K 1/27* (2006.01)
*H02K 21/16* (2006.01)
(Continued)

(52) U.S. Cl.
CPC ............. *H02K 21/16* (2013.01); *F25B 31/02* (2013.01); *F25B 31/023* (2013.01); *H02K 1/02* (2013.01); *H02K 1/2706* (2013.01)

(58) Field of Classification Search
CPC ........... H02K 1/22; H02K 1/24; H02K 1/246; H02K 1/26; H02K 1/27; H02K 1/2706;
(Continued)

(56) References Cited

U.S. PATENT DOCUMENTS

| 6,369,480 B1* | 4/2002 | Nishiyama | ............. H02K 1/148 310/156.38 |
| 6,858,961 B2* | 2/2005 | Tagome | ................. H02K 1/246 310/156.53 |

(Continued)

FOREIGN PATENT DOCUMENTS

| CN | 103259351 A | 8/2013 |
| JP | H06-339240 A | 12/1994 |

(Continued)

OTHER PUBLICATIONS

International Search Report of the International Searching Authority mailed Jul. 14, 2015 for the corresponding international application No. PCT/JP2015/061707 (and English translation).

(Continued)

*Primary Examiner* — Tran Nguyen
(74) *Attorney, Agent, or Firm* — Posz Law Group, PLC

(57) ABSTRACT

In an interior permanent magnet motor, a magnet insertion hole of a rotor core is curved into an arc shape, and a convex portion side of the arc shape is arranged on a center side of a rotor. The magnet insertion hole has a first line, a second line, and a pair of third lines. The first line is located on the radially outer side of the second line. Each of the third lines connects the first line and the second line to each other. The first line includes an arc portion and a pair of concave (Continued)

portions. Each of the concave portions is located at an end of the arc portion of the first line.

8 Claims, 12 Drawing Sheets

(51) Int. Cl.
    *H02K 1/02*       (2006.01)
    *F25B 31/02*      (2006.01)

(58) Field of Classification Search
    CPC ...... H02K 1/276; H02K 1/2766; H02K 21/12; H02K 21/14; H02K 21/16
    See application file for complete search history.

(56) References Cited

U.S. PATENT DOCUMENTS

| | | | | |
|---|---|---|---|---|
| 6,917,133 | B2* | 7/2005 | Koharagi | H02K 1/2766 |
| | | | | 310/156.48 |
| 6,979,924 | B2* | 12/2005 | Nishiyama | H02K 1/148 |
| | | | | 310/156.38 |
| 8,106,557 | B2* | 1/2012 | Yoshino | H02K 1/276 |
| | | | | 310/156.53 |
| 2003/0178905 | A1 | 9/2003 | Koharagi et al. | |
| 2008/0224558 | A1* | 9/2008 | Ionel | H02K 1/276 |
| | | | | 310/156.57 |
| 2009/0152972 | A1* | 6/2009 | Nishijima | H02K 1/276 |
| | | | | 310/156.57 |
| 2013/0140933 | A1 | 6/2013 | Katsuhisa et al. | |

FOREIGN PATENT DOCUMENTS

| | | |
|---|---|---|
| JP | 2001-037186 A | 2/2001 |
| JP | 2001037186 A | 2/2001 |
| JP | 2002-354727 A | 12/2002 |
| JP | 2013-118788 A | 6/2013 |
| JP | 2013-126291 A | 6/2013 |
| WO | 2004/021551 A | 3/2004 |
| WO | 2014/046228 A1 | 3/2014 |
| WO | 2014/125599 A1 | 8/2014 |
| WO | 2015/037127 A1 | 3/2015 |
| WO | 2015/162690 A1 | 10/2015 |

OTHER PUBLICATIONS

Extended EP Search Report dated Oct. 16, 2017 corresponding to EP patent application No. 15782513.4.

* cited by examiner

EMBEDDED PERMANENT MAGNET-TYPE ELECTRIC MOTOR, COMPRESSOR, AND REFRIGERATION/AIR-CONDITIONING DEVICE

CROSS REFERENCE TO RELATED APPLICATIONS

This application is a U.S. national stage application of PCT/JP2015/061707 filed on Apr. 16, 2015, which claims priority to International Patent Application No. PCT/JP2014/061370 filed on Apr. 23, 2014, the contents of which are incorporated herein by reference.

TECHNICAL FIELD

The present invention relates to an interior permanent magnet motor, a compressor, and a refrigeration and air conditioning apparatus.

BACKGROUND ART

In a motor described in Patent Literature 1, slits extending from a radially outer side of magnet insertion holes toward an outer peripheral surface of a rotor are formed in core regions of the rotor, which are located on a radially outer side of permanent magnets, so that a stator magnetic flux in a q-axis phase is hardly linked with the core regions located on the radially outer side of the permanent magnets to reduce unbalance in rotor magnetic attraction force, thereby reducing vibration and noise.

Further, in the motor, each of the permanent magnets to be built in the rotor is formed so as to have an arc-like cross section, while each of the permanent magnets is arranged in a rotor core so that a convex portion side is oriented toward a radially inner side.

Through the arrangement described above, the area of surfaces of the magnets can be designed to be large to increase a magnetic flux generated by the permanent magnets so as to increase a driving torque of the motor. In this manner, downsizing can be achieved or drive efficiency can be improved.

CITATION LIST

Patent Literature

[PTL 1] JP 2001-37186 A

SUMMARY OF INVENTION

Technical Problem

When permanent magnets, each having an arc shape, are used, the permanent magnets are generally arranged so that an arc is convex toward the radially inner side as described in Patent Literature 1. Therefore, arc side surfaces of each of the magnets and arc side surfaces of each of the magnet insertion holes are arranged in proximity to a rotor outer peripheral surface. The arc side surface portions of the magnet and the arc side surface portions of the magnet insertion hole on a rotor outer periphery have a lower permeability than that of the core regions at a magnetic pole center. Therefore, the magnetic flux generated by a stator coil is hardly linked. Hence, the magnetic flux is concentrated in the core regions at arc-surface ends of the magnetic insertion hole, which are adjacent to the arc side surface portions of the magnet insertion hole, during electrical conduction of the stator. Further, when the slits are formed, a path of the magnetic flux is blocked. Hence, local concentration of the magnetic flux occurs. As a result, unbalance in magnetic flux density occurs on a rotor outer peripheral surface. An electromagnetic excitation force is generated due to the unbalance in the magnetic flux density to cause vibration. Further, when the magnetic flux generated by the stator coil increases, there is a problem in that surface ends of the permanent magnet in the proximity to the core regions at the arc surface ends are liable to be demagnetized.

The present invention has been made in view of the above, and has an object to provide an interior permanent magnet motor capable of suppressing unbalance in magnetic flux density on a rotor outer peripheral surface, which is caused by a magnetic flux distribution generated due to a rotating direction during driving of the motor, to thereby reduce vibration while having slits so as to reduce unbalance in rotor magnetic attraction force.

Solution to Problem

In order to achieve the above-mentioned object, according to one embodiment of the present invention, there is provided an interior permanent magnet motor, including: a rotor including a permanent magnet; and a stator, in which the rotor further includes a rotor core, in which the rotor core has a magnet insertion hole and a slit, in which the permanent magnet is inserted into the magnet insertion hole, in which the magnet insertion hole is curved into an arc shape, and a convex portion side of the arc shape is arranged on a center side of the rotor, in which the slit is arranged in a region of the rotor core, which is located on a radially outer side of the magnet insertion hole, in which the magnet insertion hole has a first line, a second line, and a pair of third lines, in which the first line is located on the radially outer side of the second line, in which each of the third lines connects the first line and the second line to each other, in which the first line includes an arc portion and a pair of concave portions, and in which each of the concave portions is located at an end of the arc portion of the first line.

Further, in order to achieve the same object, according to one embodiment of the present invention, there is provided a compressor including, in an airtight container, a motor and a compression element. The motor is the above-mentioned interior permanent magnet motor of the one embodiment of the present invention.

Further, in order to achieve the same object, according to one embodiment of the present invention, there is provided a refrigeration and air conditioning apparatus including the above-mentioned compressor of the one embodiment of the present invention as a component of a refrigeration cycle.

Advantageous Effects of Invention

According to the present invention, the unbalance in magnetic flux density on the rotor outer peripheral surface can be suppressed to reduce the vibration with little change in the effect of reducing the magnetic attraction force generated by the stator magnetic flux.

DESCRIPTION OF EMBODIMENTS

Figure 1:
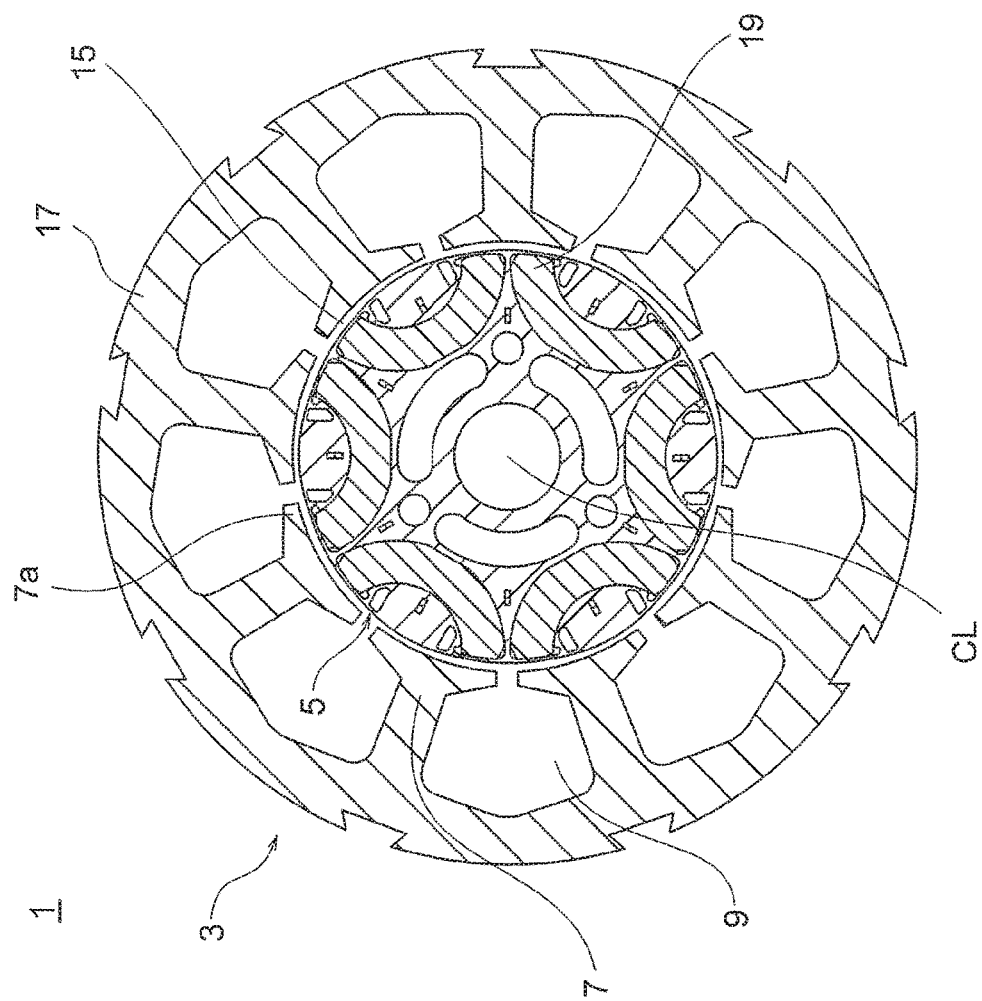
FIG. 1 is a view for illustrating a cross section orthogonal to a rotation center line of an interior permanent magnet motor according to a first embodiment of the present invention.

Now, embodiments of the present invention are described referring to the accompanying drawings. Note that, in the drawings, the same reference symbols represent the same or corresponding parts.

First Embodiment

Figure 2:
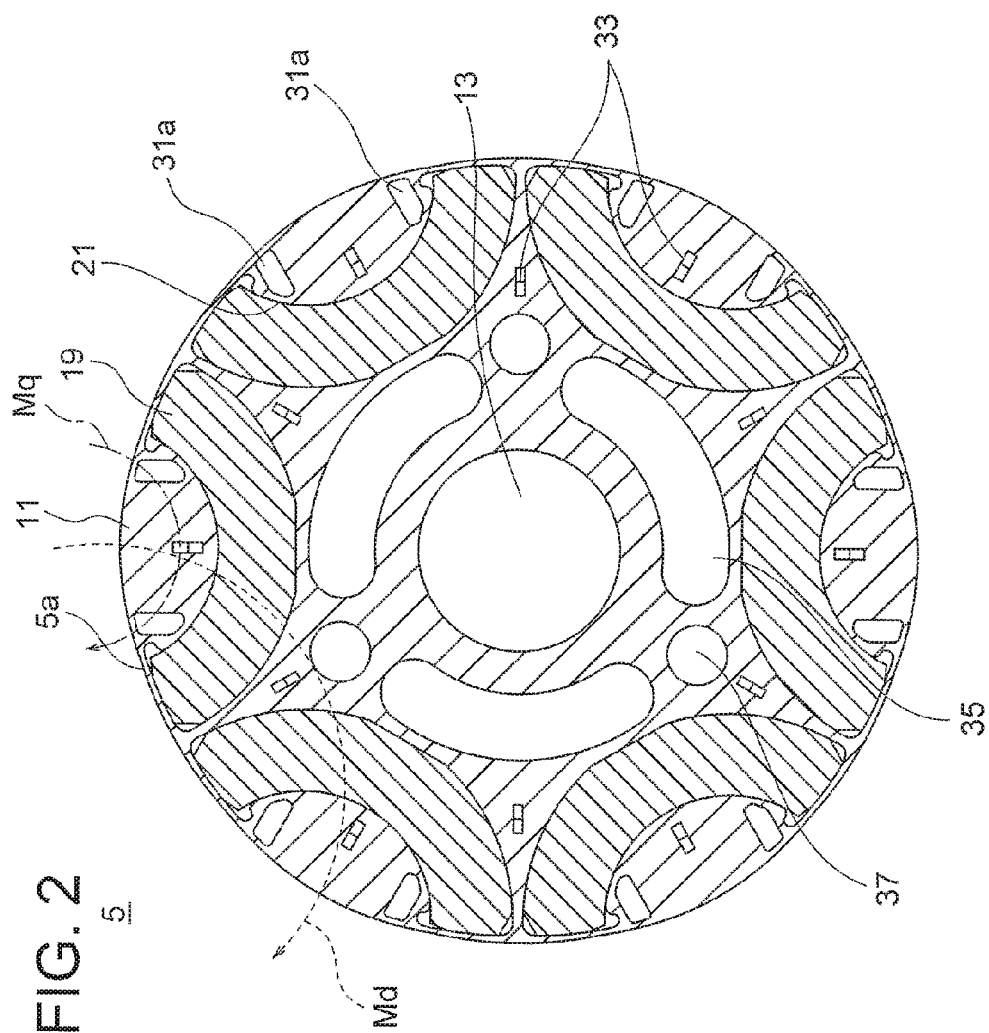
FIG. 2 is a view for illustrating a rotor in FIG. 1 in an enlarged manner.
Figure 3:
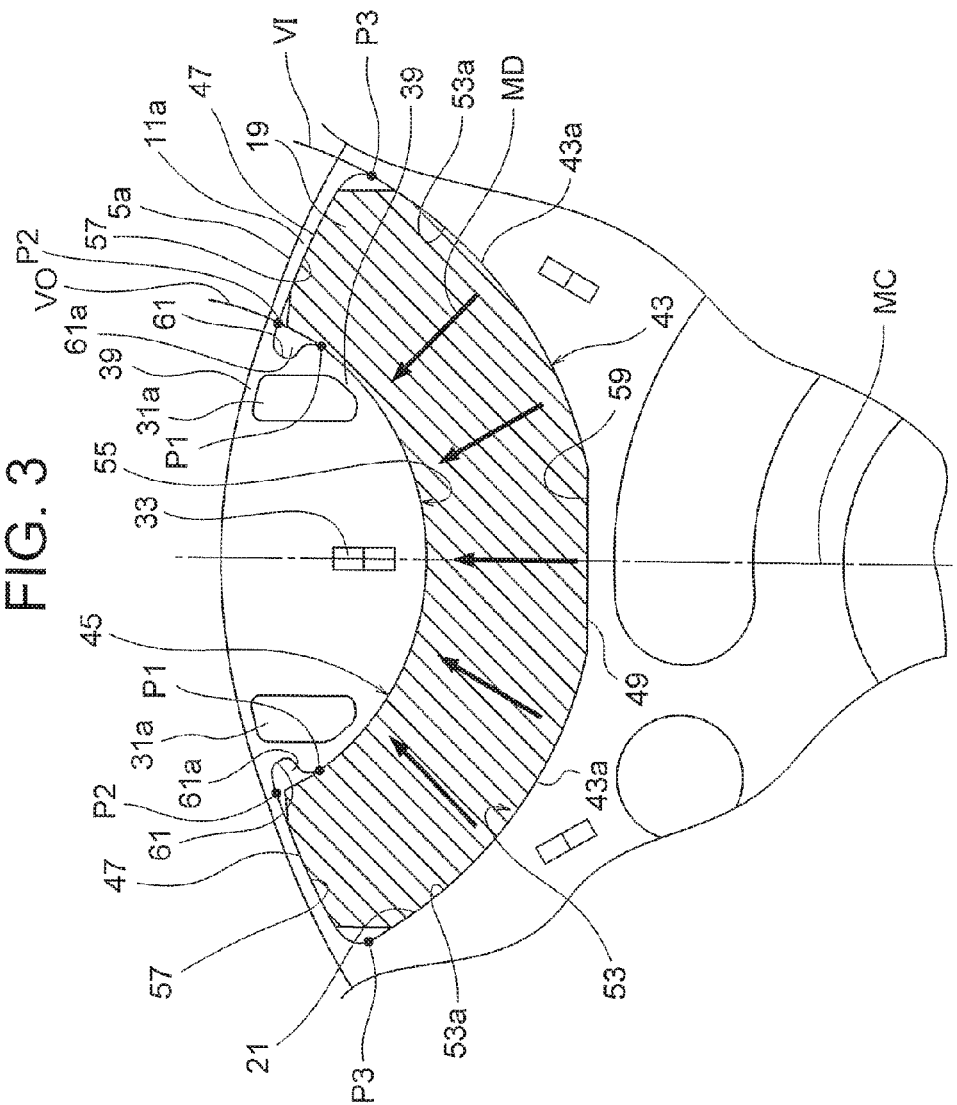
FIG. 3 is a view for illustrating a magnet insertion hole and a plurality of slits in FIG. 2 in an enlarged manner.
Figure 4:
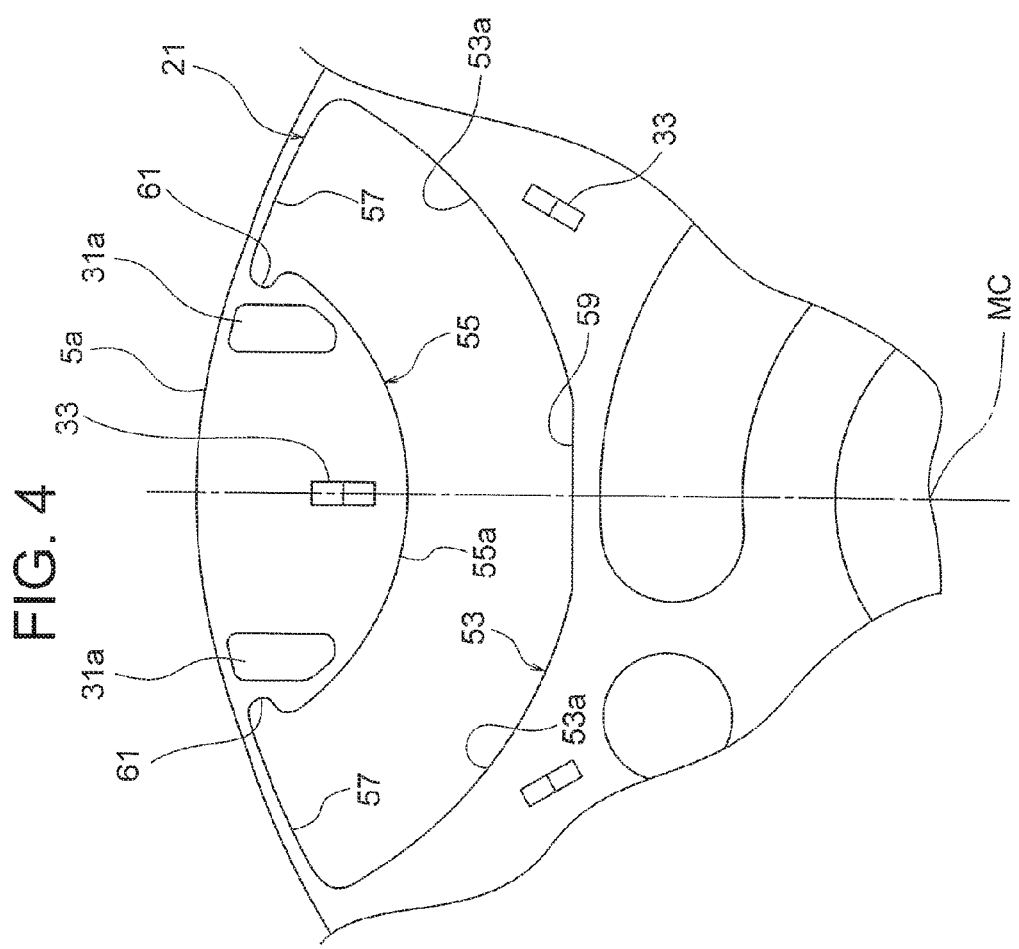
FIG. 4 is a view for illustrating a state in which a permanent magnet is not inserted into the magnet insertion hole in FIG. 3.

FIG. 1 is a view for illustrating a cross section orthogonal to a rotation center line of an interior permanent magnet motor according to a first embodiment of the present invention. FIG. 2 is a view for illustrating a rotor in FIG. 1 in an enlarged manner. FIG. 3 is a view for illustrating a magnet insertion hole and a plurality of slits in FIG. 2 in an enlarged manner. FIG. 4 is a view for illustrating a state in which a permanent magnet is not inserted into the magnet insertion hole in FIG. 3.

As illustrated in FIG. 1 to FIG. 4, an interior permanent magnet motor 1 includes a stator 3 and a rotor 5 rotatably arranged so as to be opposed to the stator 3. The stator 3 includes a plurality of tooth portions 7. Each of the plurality of tooth portions 7 is adjacent to other tooth portions 7 through intermediation of corresponding slot portions 9. The plurality of tooth portions 7 and a plurality of the slot portions 9 are arranged alternately at equal intervals in a circumferential direction. A publicly-known stator winding (not shown) is wound around each of the plurality of tooth portions 7 in a publicly-known pattern.

The rotor 5 includes a rotor core 11 and a shaft 13. The shaft 13 is coupled to an axial center portion of the rotor core 11 by shrink fitting, press fitting, or the like to transmit rotational energy to the rotor core 11. An air gap 15 is secured between an outer peripheral surface of the rotor and an inner peripheral surface of the stator.

In such a configuration, the rotor 5 is held on an inner side of the stator 3 through intermediation of the air gap 15 so as to be rotatable about a rotation center line CL (rotation center of the rotor). Specifically, a current having a frequency synchronized with an instructed number of revolutions is supplied to the stator 3 to generate a rotation magnetic field, thereby rotating the rotor 5. The air gap 15 between the stator 3 and the rotor 5 is an air gap of from 0.3 mm to 1 mm.

Next, configurations of the stator 3 and the rotor 5 are described in detail. The stator 3 includes a stator core 17. The stator core 17 is formed by punching magnetic steel plates each having a thickness of from about 0.1 mm to about 0.7 mm into a predetermined shape, and laminating a predetermined number of the magnetic steel plates while fastening the magnetic steel plates by caulking. In this case, a magnetic steel plate having a plate thickness of 0.35 mm is used.

The stator core 17 includes nine tooth portions 7 formed on a radially inner side thereof so as to be arranged approximately at equal intervals in the circumferential direction. The tooth portions 7 are formed in a radial fashion. In a region of the stator core 17, which is located between the adjacent tooth portions 7, the corresponding slot portion 9 is formed.

Each of the tooth portions 7 extends in a radial direction and projects toward the rotation center line CL. Further, a most part of each of the tooth portions 7 has an approximately equal circumferential width from a radially outer side to a radially inner side. A tooth tip portion 7a is formed at a distal end of the tooth portion 7, which is located on a radially innermost side. Each of the tooth tip portions 7a is formed in an umbrella-like shape having both side portions increased in the circumferential direction.

The stator windings (not shown) that form coils (not shown) configured to generate a rotation magnetic field are wound around the tooth portions 7. The coil is formed by directly winding a magnet wire around the tooth portion through intermediation of an insulating member. This winding method is called "concentrated winding". The coils are connected in a three-phase Y configuration. The number of turns and a wire diameter of the coil are determined in accordance with required characteristics (such as the number of revolutions and a torque), voltage specifications, and the sectional area of the slot. In this case, divided teeth are developed in a band-like fashion so as to facilitate winding. A magnet wire having a wire diameter φ of about 1.0 mm is wound around the tooth portion of each magnetic pole to make about 80 turns. After the winding, the divided teeth are formed into an annular shape, which are then welded to form the stator.

The rotatably held shaft 13 is arranged in the vicinity of a center of the stator 3. Further, the rotor 5 is fitted onto the shaft 13. The rotor 5 includes the rotor core 11, and similarly to the stator core 17, the rotor core 11 is also formed by punching magnetic steel plates each having a thickness of from about 0.1 mm to about 0.7 mm into a predetermined shape, and laminating a predetermined number of the magnetic steel plates while fastening the magnetic steel plates by caulking. In this case, the magnetic steel plate having a plate thickness of 0.35 mm is used.

The rotor 5 is an interior magnet rotor. A plurality of permanent magnets 19 (six permanent magnets in this specific example), which are magnetized so that the N poles and the S poles are alternately located, are arranged in the rotor core 11. Each of the permanent magnets 19 is curved into an arc shape as viewed in the cross section having the rotation center line CL of the rotor 5 as the normal, and is arranged so that a convex portion side of the arc shape is located on the center side of the rotor 5. Each of the permanent magnets 19 is curved so as to be linearly symmetric across a corresponding magnetic pole center line MC.

In more detail, magnet insertion holes 21 as many as the number of the plurality of permanent magnets 19 are formed in the rotor core 11. The corresponding permanent magnets 19 are inserted into a plurality of the magnet insertion holes 21, respectively. One permanent magnet 19 is inserted into one magnet insertion hole 21. Further, as can be understood therefrom, concave portions 61 and the magnet insertion hole 21 are curved so as to be linearly symmetric across the corresponding magnetic pole center line MC.

The number of magnetic poles of the rotor 5 may be any number of poles equal to or larger than two. In this embodiment, a case of six poles is exemplified. In this case, ferrite magnets are used as the permanent magnets 19. An inner peripheral surface and an outer peripheral surface of each of the ferrite magnets are respectively formed into given concentric arc shapes so that a thickness of the ferrite magnet in a radial direction of curvature is uniformly maintained to about 6 mm.

Further, magnets each applied with an oriented magnetic field from a center of the concentric arcs as indicated by the arrows MD in FIG. 3 (that is, magnets having a magnetizing direction MD) are used as the permanent magnets 19. In addition, the magnets are inserted into the magnet insertion holes each having a shape along the magnet.

As the kind of magnets, for example, rare-earth magnets containing neodymium, iron, and boron as main components may be used. The shape of each of the magnets is not limited to the arc shape, and may also be a flat plate shape. Alternatively, a plurality of the flat plate magnets may be arranged to form a magnetic pole.

In a region of the rotor core 11, which is located on a radially outer side of each of the magnet insertion holes 21, a plurality of slits 31a are formed. Each of the plurality of slits 31a is an air gap portion extending from the vicinity of a hole defining portion of the corresponding magnet insertion hole 21, which is located on the radially outer side (hole outer-side line 55 described later), to the vicinity of a rotor outer peripheral surface 5a.

The rotor core 11 has two slits 31a for one magnetic pole. A long axis direction of each of the slits 31a extends so as to be directed in a direction approximately parallel to the corresponding magnetic pole center line MC. The two slits 31a are formed linearly symmetric across the magnetic pole center line MC. Further, the two slits 31a are provided at positions closer to hole side lines 57 described later than to the magnetic pole center line ML.

A caulking portion 33 is formed on the magnetic pole center line MC. As a result, a laminate in a core region of the rotor 5, which is located on a radially outer side of the magnetic insertion hole 21, is fixed to suppress deformation during manufacture.

A plurality of air holes 35 and a plurality of rivet holes 37, which are arranged alternately at equal intervals in the circumferential direction, are formed on the radially inner side of the magnet insertion holes 21. The caulking portion 33 is also provided between the corresponding rivet hole 37 and a corresponding pair of the magnet insertion holes 21.

Further, a role of the slits is described. The interior permanent magnet motor 1 has the core regions on the radially outer side of the permanent magnets 19 of the rotor 5. Therefore, there are a d-axis direction corresponding to a magnetic pole center line direction, in which the stator magnetic flux is hardly linked, as indicated by the reference symbol Md, and a q-axis direction corresponding to a direction perpendicular to the magnetic pole center line, in which the stator magnetic flux is liable to be linked, as indicated by the reference symbol Mq. There are advantages in that a reluctance torque can be utilized owing to a salient pole difference in magnetic resistance, and that a field weakening operation can be achieved by causing a current in a d-axis phase to flow therethrough.

When a rotation center of the rotor 5 is misaligned from a rotation center of the stator 3 or unbalance occurs in the rotation magnetic field, however, unbalance occurs in rotor magnetic attraction force when the stator magnetic flux in a q-axis phase is linked with the core regions of the rotor, which are located on the radially outer side of the permanent magnets. As a result, there is a problem in that vibration is increased.

Specifically, the six-pole rotor is used in this embodiment. Therefore, six core regions are present on the radially outer side of the permanent magnets. In this case, the unbalance in the rotor magnetic attraction force at the time of linkage of the stator magnetic flux in the q-axis phase with the core regions on the radially outer side of the permanent magnets occurs six times during one revolution of the rotor. As a result, vibration of a component of order sixfold greater than the number of revolutions occurs. As a different example, vibration of a component of order fourfold greater than the number of revolutions occurs in an interior permanent magnet motor using four magnets when the rotation center of the rotor is misaligned from the rotation center of the stator or the unbalance occurs in the rotation magnetic field.

Therefore, in order to suppress the vibration described above, the slits (air gap portions) extending from the radially outer side of the magnet insertion holes toward the outer peripheral surface of the rotor are formed in the core regions of the rotor, which are located on the radially outer side of the permanent magnets. As a result, the stator magnetic flux in the q-axis phase is hardly linked with the core regions on the radially outer side of the permanent magnets to reduce the unbalance in the rotor magnet attraction force, thereby reducing the vibration. In order to reduce the unbalance in the magnetic attraction force of the rotor, which is caused by the stator magnetic flux, a slit shape, with which the stator magnetic flux in the q-axis phase is hardly linked, is preferred. More specifically, the slit having a shape that extends from the radially outer side of the magnet insertion hole to the vicinity of the outer peripheral surface of the rotor in a direction approximately parallel to the corresponding magnetic pole center line MC (long axis direction) and has a large width in a short axis direction (direction orthogonal to the long axis direction) is effective.

Further, a core thin portion 39 is formed between each of the slits 31a and the magnet insertion hole 21. A core thin portion 39 is also formed between each of the slits 31a and the rotor outer peripheral surface 5a. In order to suppress the linkage of the stator magnetic flux in the q-axis phase, it is preferred that each of the core thin portions 39 be as narrow as possible. In this case, a minimum width of the core thin portion (minimum interval between the slit and the magnet insertion hole or minimum interval between the slit and the rotor outer peripheral surface) is set to about 0.35 mm, which is equal to the plate thickness of the magnetic steel plate, corresponding to the minimum press-working allowable width. In this manner, the slits 31a extend over a long distance from the vicinity of the rotor outer peripheral surface 5a to the vicinity of the magnet insertion hole 21.

Further, for the width of the slit (in the short axis direction), a width of the widest portion is about 0.5 mm to about 3 mm. Specifically, the width and the arrangement of the slits are determined so that the unbalance in the magnetic attraction force (vibration of a sixth-order component) of the rotor due to the stator magnetic flux is reduced.

Further, the slits have a role of restricting orientation of the magnetic flux of the permanent magnet. It is preferred that a magnetic flux density distribution on the rotor outer peripheral surface be a sinusoidal distribution with peaks at positions of the magnetic pole center lines of the rotor. Therefore, each of related-art slits is generally formed in a linearly symmetrical shape across the magnetic pole center line so that the orientation of the slit in the long axis direction is directed to a direction approximately parallel to the magnetic pole center line or a distal end of the slit on the rotor outer peripheral side is oriented in a direction toward the magnetic pole center line. Specifically, a width of the core region between the adjacent slits is generally formed constant from the magnet insertion hole side toward the rotor outer peripheral surface or so as to be narrower from the magnet insertion hole side toward the rotor outer peripheral surface. In this manner, the magnetic flux density of the core in the vicinity of the rotor outer peripheral surface is set so as to be increased in the vicinity of the magnetic pole center line. The magnetic flux density distribution on the rotor peripheral surface is formed as the sinusoidal distribution with the peaks at the positions of the magnetic pole center lines of the rotor by the slits, thereby also providing an effect of reducing the vibration.

Next, the permanent magnet 19 and the magnet insertion hole 21 are described in detail. Each of the permanent magnets 19 and the magnet insertion holes 21 is formed linearly symmetric across the corresponding magnetic pole center line ML as viewed in the cross section having the rotation center line CL of the rotor 5 as the normal.

Each of the permanent magnets 19 has an inner-side contour surface 43, an outer-side contour surface 45, and a pair of side contour surfaces 47 as viewed in the cross section having the rotation center line CL of the rotor 5 as the normal. The "outer side" and the "inner side" of the inner-side contour surface and the outer-side contour surface indicate any of a radially inner side and a radially outer side through relative comparison as viewed in a plane having the rotation center line CL as the normal.

Each of the magnet insertion holes 21 includes the hole outer-side line 55 corresponding to a first line, a hole inner-side line 53 corresponding to a second line, and a pair of hole side lines 57 corresponding to a pair of third lines as a profile of the hole as viewed in the cross section having the rotation center line CL of the rotor 5 as the normal. The "outer side" and the "inner side" of the hole inner-side line and the hole outer-side line also indicate any of the radially inner side and the radially outer side through relative comparison as viewed in a plane having the rotation center line CL as the normal.

Most part of the outer-side contour surface 45 is formed by a first arc surface having a first arc radius. Most part of the hole outer-side line 55 is also formed by a first arc surface 55a having the first arc radius. On the other hand, the inner-side contour surface 43 is formed by a second arc surface 43a having a second arc radius larger than the first arc radius and a straight surface 49. Similarly, the hole inner-side line 53 is formed by a second arc surface 53a having the second arc radius and a straight surface 59.

The permanent magnet 19 is to be inserted into the magnet insertion hole 21. Therefore, the first arc radius and the second arc radius for the magnet insertion hole 21 and the first arc radius and the second arc radius for the permanent magnet 19 are not the same in an extremely strict sense. However, in view of the relationship in which the permanent magnet 19 is perfectly fitted into the magnet insertion hole 21 and for easy understanding of the description, the common words are used for the permanent magnet and the magnet insertion hole.

The first arc radius and the second arc radius have a common radius center. The common radius center is present on the radially outer side of the permanent magnet 19 and the magnet insertion hole 21 and is located on the corresponding magnetic pole center line ML. In other words, the inner-side contour surface 43 (hole inner-side line 53) and the outer-side contour surface 45 (hole outer-side line 55) are formed concentrically so that a center of the first arc surface and a center of the second arc surface coincide with an orientation center (orientation focus) of the permanent magnet. The arrows denoted by the reference symbol MD in FIG. 3 schematically indicate a direction of orientation.

The straight surface 49 and the straight surface 59 extend in a direction orthogonal to the magnetic pole center line ML as viewed in the cross section having the rotation center line CL of the rotor 5 as the normal.

The pair of side contour surfaces 47 each connect a corresponding end of the inner-side contour surface 43 and a corresponding end of the outer-side contour surface 45 to each other, whereas the pair of hole side lines 57 each connect a corresponding end of the hole inner-side line 53 and a corresponding end of the hole outer-side line 55 to each other.

Each of the hole outer-side lines 55 of the magnet insertion holes 21 includes the first arc surface 55a that occupies most part of the hole outer-side line 55 and the pair of concave portions 61. The pair of concave portions 61 are located on both sides of the first arc surface 55a of the hole outer-side line 55, specifically, are located at ends of the hole outer-side line 55, which are close to the corresponding hole side lines 57. Each of the concave portions 61 extends toward the corresponding magnet pole center line ML in a circumferential direction. A bottom portion of each of the concave portions 61 is formed into an arc shape.

Figure 5:
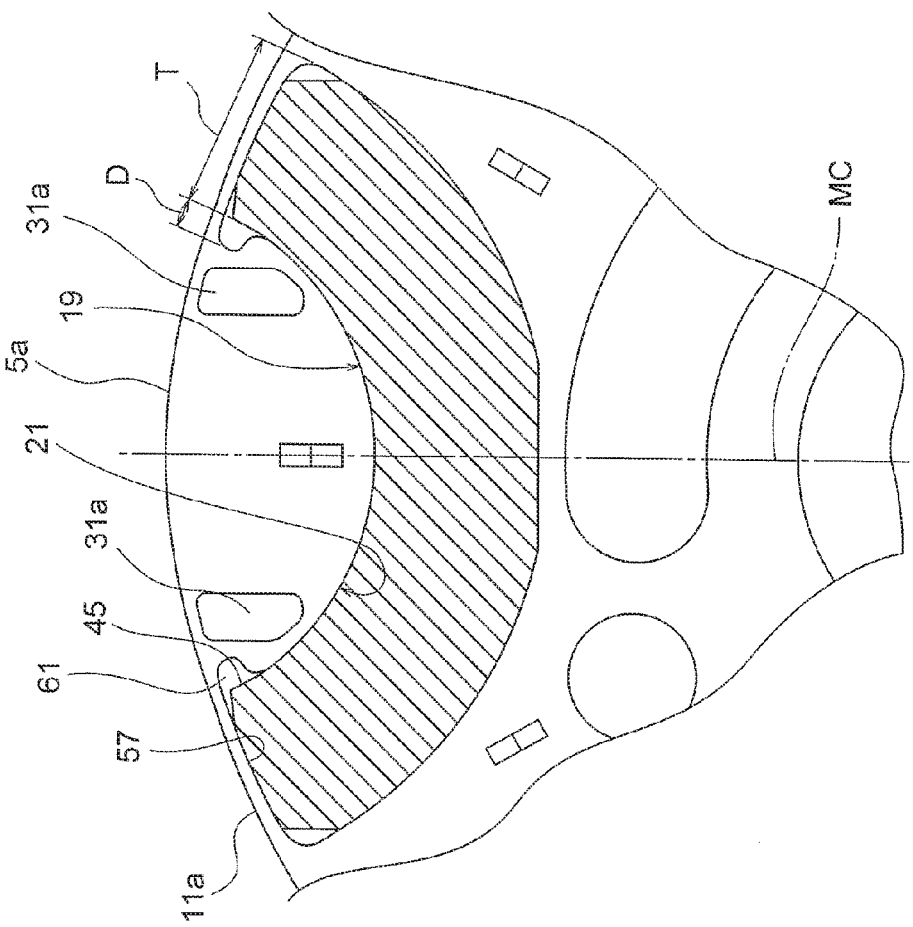
FIG. 5 is a view for illustrating a dimension of each of portions of the magnet insertion hole in the same manner as in FIG. 3.

As illustrated in FIG. 5, the concave portions 61 of the magnet insertion hole 21 and the outer-side contour surface 45 of the permanent magnet 19 are greatly spaced away from each other under a state in which the permanent magnet 19 is inserted into the magnet insertion hole 21. Thus, an air gap 61a, which is a non-magnetic region, is formed between each of the concave portions 61 and the outer-side contour surface 45. A depth D of the concave portion 61 (distance between the bottom portion of the concave portion 61 and the outer-side contour surface 45 of the permanent magnet 19) is significantly smaller than a thickness T of the permanent magnet 19, and is, for example, about 1 mm.

The hole side lines 57 of the magnet insertion hole 21 are arranged in proximity to the rotor outer peripheral surface 5a. A side end thin portion 11a having a uniform thickness is present between each of the hole side lines 57 of the magnet insertion hole 21 and the rotor outer peripheral surface 5a. Each of those side end thin portions 11a serves as a path for a short-circuit magnetic flux between the adjacent magnetic poles. Therefore, it is preferred that a thickness of the side end thin portion 11a be as small as possible. Here, the thickness of the side end thin portion 11a is set to 0.35 mm, which is approximately equal to a plate thickness of the magnetic steel plate as a minimum press-working allowable width.

Further, the first line (hole outer-side line 55), the second line (hole inner-side line 53), and the third lines (hole side lines 57) as viewed in the cross section having the rotation center line CL of the rotor 5 as the normal are now described. The first line is located on the radially outer side of the second line, and includes the main arc portion 55a along a virtual arc VO on a rotor outer diameter side (radially outer side), which is approximately perpendicular to the magnetizing direction MD of the permanent magnet, and the pair of concave portions 61. The main arc portion 55a is along the above-mentioned virtual arc VO, and is a portion having two points P1 on the virtual arc VO as both ends in FIG. 3. Further, the main arc portion 55a includes exclusively a portion along the virtual arc VO although it is only an example. The pair of concave portions 61 are located on both sides of the main arc portion 55a. Specifically, the main arc portion 55a is sandwiched between the pair of concave portions 61. In other words, the pair of concave portions 61 are located at corresponding ends of the first line (hole outer-side line 55). The first line is a portion having two points P2 on the virtual arc VO as both ends. Each of the concave portions 61 is a portion having P1 on the virtual arc VO and P2 on the virtual arc VC as both ends.

The second line (hole inner-side line 53) extends along a virtual arc VI on a rotor center side (radially inner side), which is approximately perpendicular to the magnetizing direction MD of the permanent magnet. Further, the second line includes a portion along the virtual arc VI and a straight line presenting the straight surface 59 although it is only an example. The second line is a portion having two points P3 on the virtual arc VI as both ends in FIG. 3.

The third lines (hole side lines 57) are portions that connect the first line and the second line. More specifically, each of the third lines is a portion that connects P2 being a terminal end of the first line and P3 being a terminal end of the second line. Each of the pair of concave portions 61 is a part of the first line having terminal ends on the virtual arc VO, and is not a part of the third lines. As can be seen from FIG. 3, the permanent magnet is arranged so that a part of the permanent magnet faces a portion between P1 and P2, which are both ends of each of the concave portions 61. The magnetic flux of the permanent magnet is generated in the magnetizing direction. Specifically, a plane approximately perpendicular to the magnetizing direction means a plane on which the magnetic flux is generated. Then, it is understood that the magnetic flux is not generated in a direction of the third lines.

Figure 6:
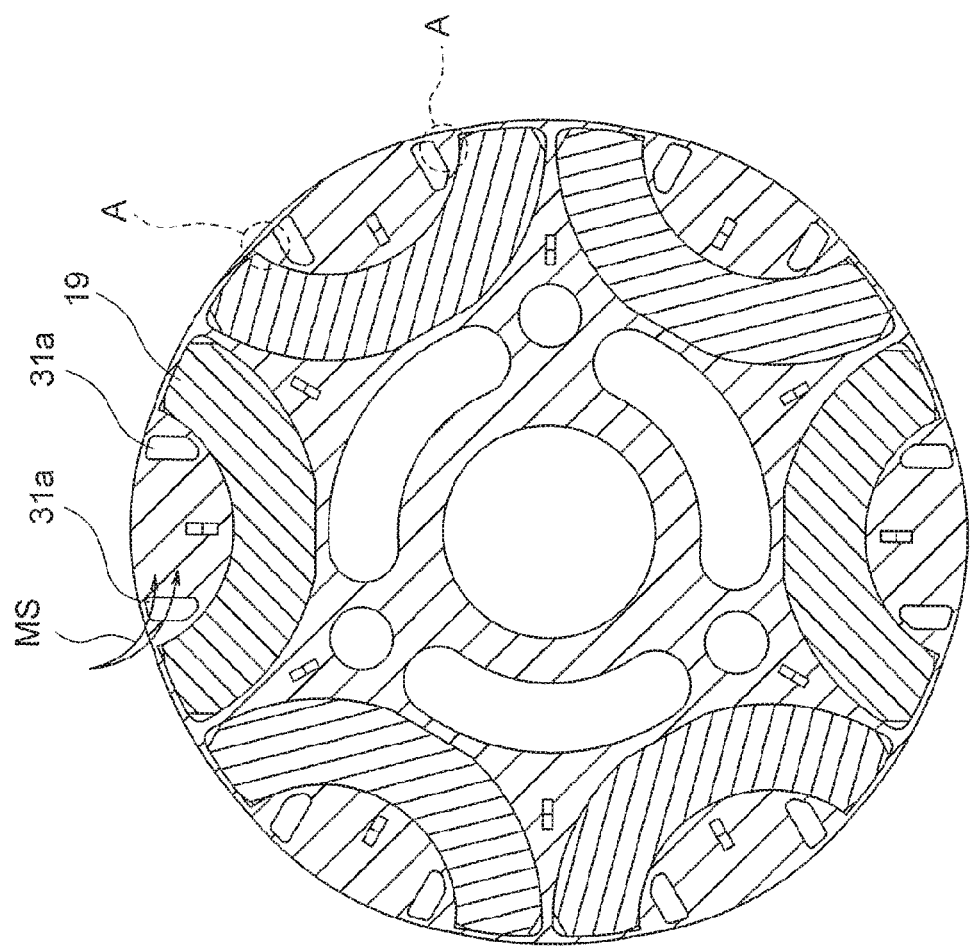
FIG. 6 is a view of the related art without concave portions in the magnet insertion hole, corresponding to FIG. 2.
Figure 7:
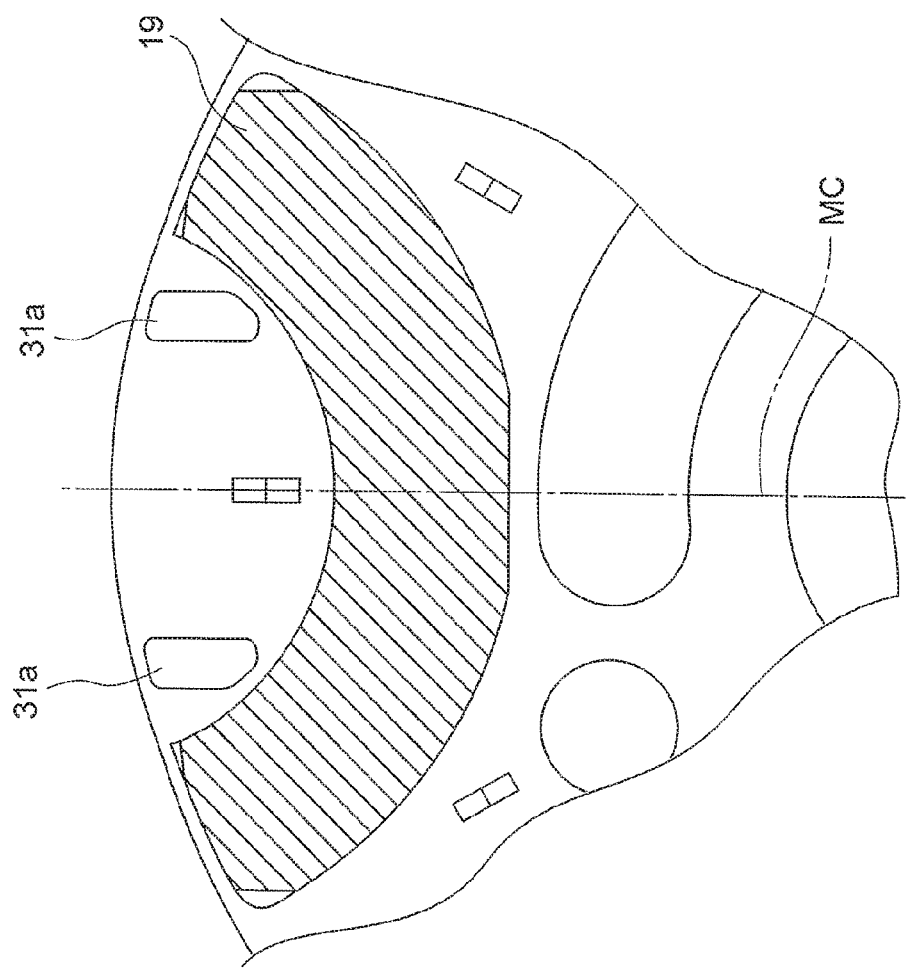
FIG. 7 is a view of the related art without concave portions in the magnet insertion hole, corresponding to FIG. 3.

Next, referring to the related art illustrated in FIG. 6 and FIG. 7, functions of the interior permanent magnet motor according to the first embodiment are described. FIG. 6 and FIG. 7 are views of the related art without the above-mentioned concave portions 61 in the magnet insertion hole, respectively corresponding to FIG. 2 and FIG. 3.

The above-mentioned side end thin portion between each of the hole side lines of the magnet insertion hole and the rotor outer peripheral surface has a function of suppressing flow of the magnetic flux equal to or larger than magnetic saturation that occurs in the side end thin portion due to the short-circuit magnetic flux generated between the adjacent magnetic poles. Therefore, the side end thin portion is a region having a permeability lower than that of the core region in the center of the magnetic pole, with which the magnetic flux generated by the stator coil is hardly linked. Therefore, a magnetic flux MS during electrical conduction of the stator is concentrated on regions A between ends of the hole outer-side line of the magnet insertion hole, which are close to the hole side lines, and the slits, while avoiding the hole side lines of the magnet insertion hole. In the rotor without the concave portions in the magnet insertion hole as in the related art illustrated in FIG. 6 and FIG. 7, it is found that the magnet flux is concentrated on one of the core regions A than on another of the core regions A by a magnetic flux distribution generated due to a rotating direction during driving of the motor in comparison between a pair of the regions A provided to one magnetic pole. As a result, unbalance in magnetic flux density occurs on the rotor outer peripheral surface to generate an electromagnetic excitation force due to the unbalance in the magnetic flux density, resulting in a cause of vibration.

Figure 8:
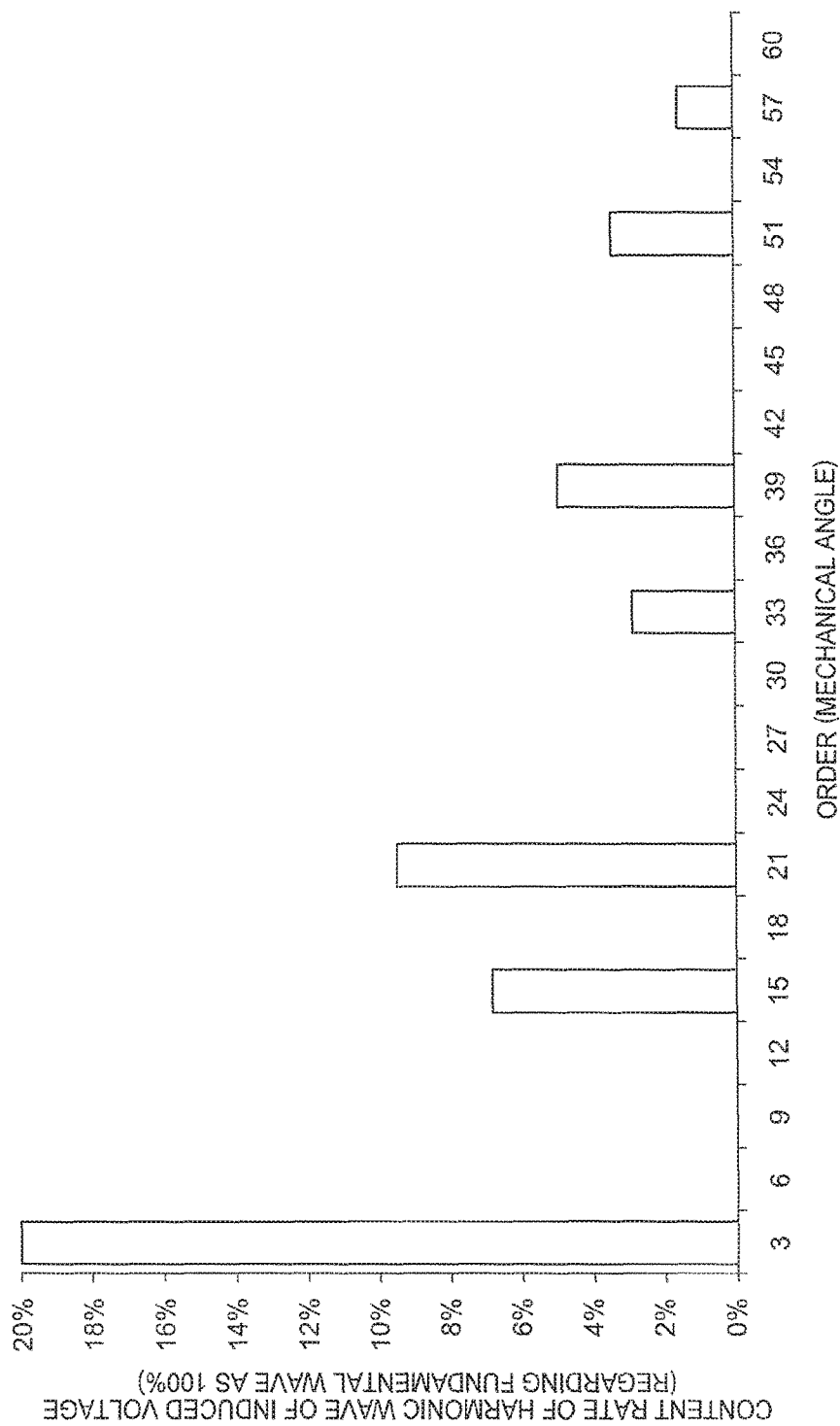
FIG. 8 is a graph for showing results obtained through FFT processing in analysis of an induced voltage generated in a coil when a current is applied to a related-art motor to drive the motor.

FIG. 8 is a graph for showing results obtained through FFT processing in analysis of an induced voltage generated in the coil when a current is applied to a related-art motor to drive the motor. Setting a third-order component (mechanical angle), which is a fundamental wave component of the induced voltage, as a reference (100%), content rates of high-order components are shown. Among the high-order components, the content rate of a 21st-order component is large, which is due to the above-mentioned unbalance in the magnetic flux density on the rotor outer peripheral surface. As a result, the electromagnetic excitation force is generated to cause the vibration.

Figure 9:
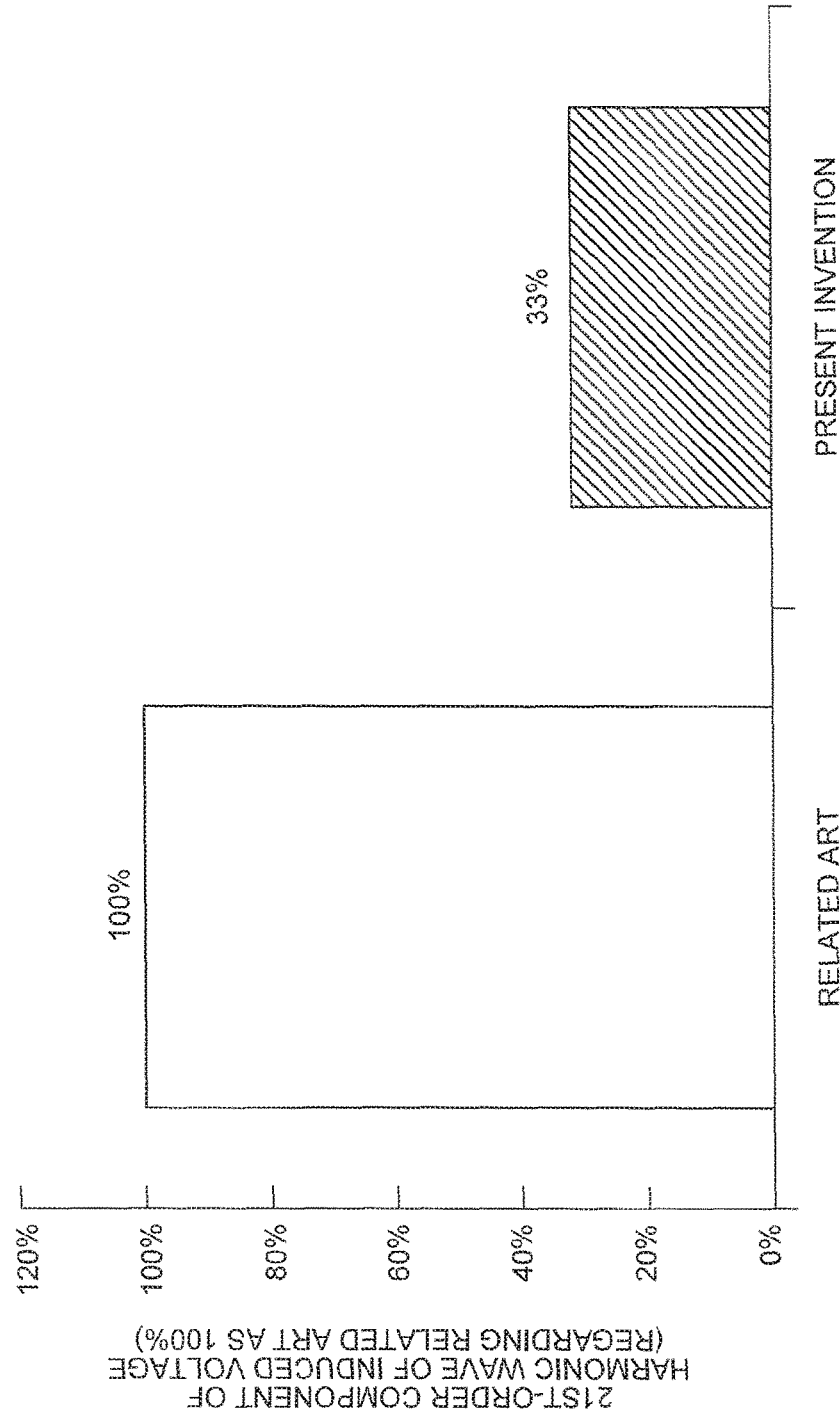
FIG. 9 is a graph for showing results of comparison between a 21st-order component in the result of analysis of the induced voltage in the related art and a 21st-order component in a result of analysis of an induced voltage in the first embodiment.

On the other hand, in the first embodiment, the concave portions are formed at the ends of the hole outer-side line of the magnet insertion hole, which are close to the hole side lines. As a result, the unbalance in the magnetic flux density on the rotor outer peripheral surface during the driving of the motor can be suppressed. FIG. 9 is a graph for showing results, which are results of comparison between the 21st-order component in the result of analysis of the induced voltage in the related art and the 21st-order component in the result of analysis of the induced voltage in the first embodiment. As can be understood from FIG. 9, according to the first embodiment, the 21st-order component is reduced to 33% in comparison to the related art. In this manner, the generation of the electromagnetic excitation force can be suppressed to reduce the vibration.

Further, as illustrated in FIG. 2 to FIG. 5, when the slits are formed at positions spaced away from the magnetic pole center line in the core region located on the radially outer side of the magnet insertion hole, specifically, when the slits are formed at positions close to the hole side lines of the magnet insertion hole, the path for the magnetic flux is liable to be blocked by the slits. Hence, the local concentration of the magnetic flux is liable to occur. Therefore, the effects obtained by providing the concave portions as in this embodiment are further enhanced.

Further, as another function of the first embodiment, the following advantage is obtained. In a pattern in which the permanent magnets and the magnet insertion holes are curved into an arc shape and the convex portion side of the arc shape is arranged close to the center side of the rotor, it is preferred that side contour surfaces of the magnet be arranged as close as possible to the rotor outer peripheral surface so as to increase the magnet surface area. In the configuration of the related art described above, however, the ends of the outer-side contour surface of the permanent magnet, which are close to the side contour surfaces, are liable to be demagnetized. A countermeasure such as providing air gaps between the side contour surfaces of the permanent magnet and the hole side lines of the permanent magnet hole is required. Therefore, the magnet surface cannot be sufficiently increased.

On the other hand, in the first embodiment, portions of the hole outer-side line of the magnet insertion hole, which are close to the hole side lines, are spaced away from the outer-side contour surface of the permanent magnet by the presence of the concave portions described above. Therefore, the stator magnetic flux is hardly linked with the permanent magnet. As a result, the motor that is hardly demagnetized can be constructed. Therefore, the permanent magnet can be arranged under a state in which the side contour surfaces themselves of the permanent magnet are located in proximity to or held in contact with the hole side lines of the permanent magnet hole. Therefore, the area of the magnet surface can be designed to be large. Thus, the magnetic flux generated by the permanent magnet can be increased so as to increase a driving torque of the motor. As a result, downsizing can be achieved or drive efficiency can be improved. The air gaps formed by the concave portions are non-magnetic portions. Therefore, it is suitable that the depth D of the concave portion be set to 30% or smaller of the thickness T of the permanent magnet so that the amount of magnetic flux generated from the magnet is hardly reduced.

As described above, according to the first embodiment, the unbalance in the magnetic flux density on the rotor outer peripheral surface, which is caused by the magnetic flux distribution generated due to the rotating direction during the driving of the motor, can be suppressed to enable the reduction of the vibration while the slits are provided so as to reduce the unbalance in the rotor magnetic attraction force.

Second Embodiment

Figure 10:
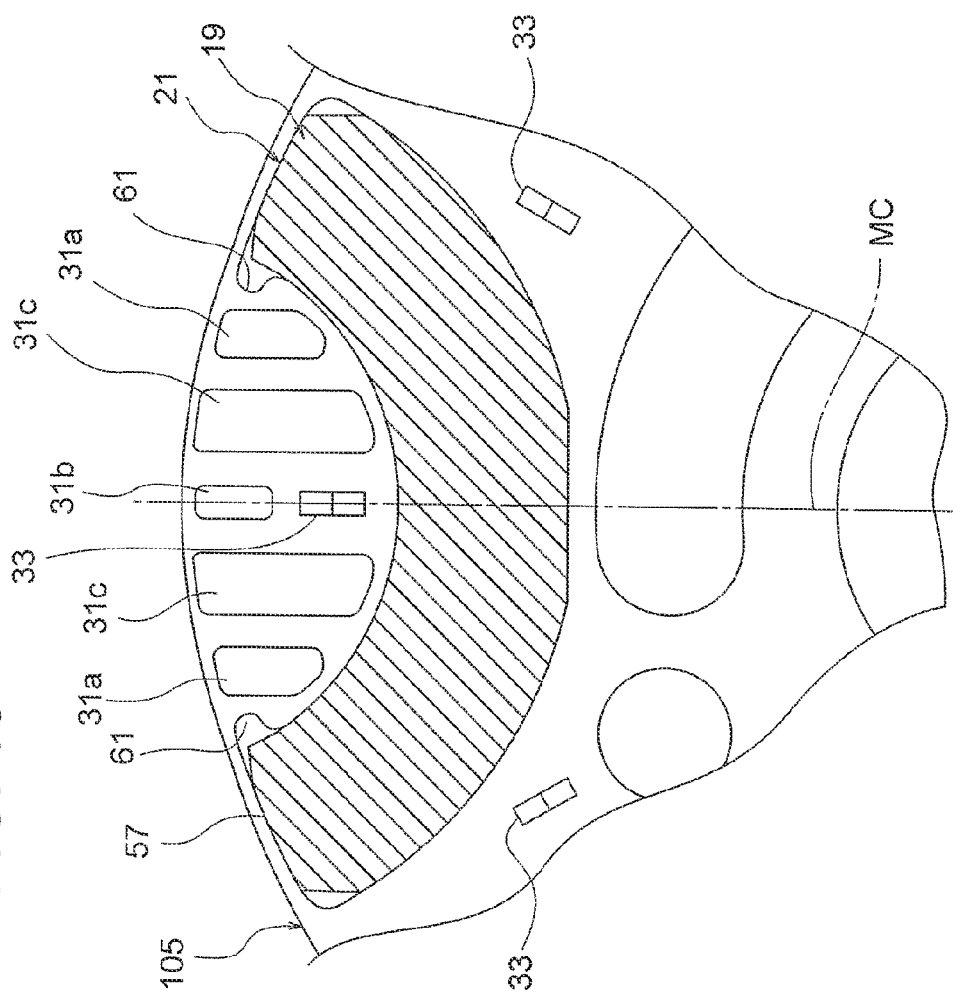
FIG. 10 is a view for illustrating a second embodiment of the present invention in the same manner as in FIG. 3.

Next, a second embodiment of the present invention is described. FIG. 10 is a view for illustrating the second embodiment in the same manner as in FIG. 3. The second embodiment is the same as the first embodiment described above except for parts to be described below.

In a rotor 105 according to the second embodiment, five slits 31a, 31b, and 31c, which are linearly symmetric across the magnetic pole center line MC, are formed at each of the magnetic poles. A long axis direction of the five slits 31a, 31b, and 31c is directed in a direction approximately parallel to the corresponding magnetic pole center line MC. One slit 31b is formed on the magnetic pole center line MC, and four slits 31a and 31b are formed at positions linearly symmetric across the magnetic pole center line MC.

The pair of slits 31a are provided in the same pattern as that of the first embodiment, and are provided at positions closer to the corresponding hole side lines 57 than to the magnetic pole center line ML. The slit 31b on the magnetic pole center line MC is located on the radially outer side of the caulking portion 33. Each of the pair of slits 31c is present at a midpoint between the slit 31b on the magnetic pole center line MC and the corresponding slit 31a (at a midpoint in a direction orthogonal to the magnetic pole center line MC).

Even in the second embodiment configured as described above, the same advantages as those of the first embodiment described above are obtained.

Third Embodiment

Next, there is described a rotary compressor having the interior permanent magnet motor according to the above-mentioned embodiment mounted therein. The present invention encompasses a compressor having the interior permanent magnet motor according to any one of the above-mentioned embodiments mounted therein. However, the type of the compressor is not limited to the rotary compressor.

Figure 11:
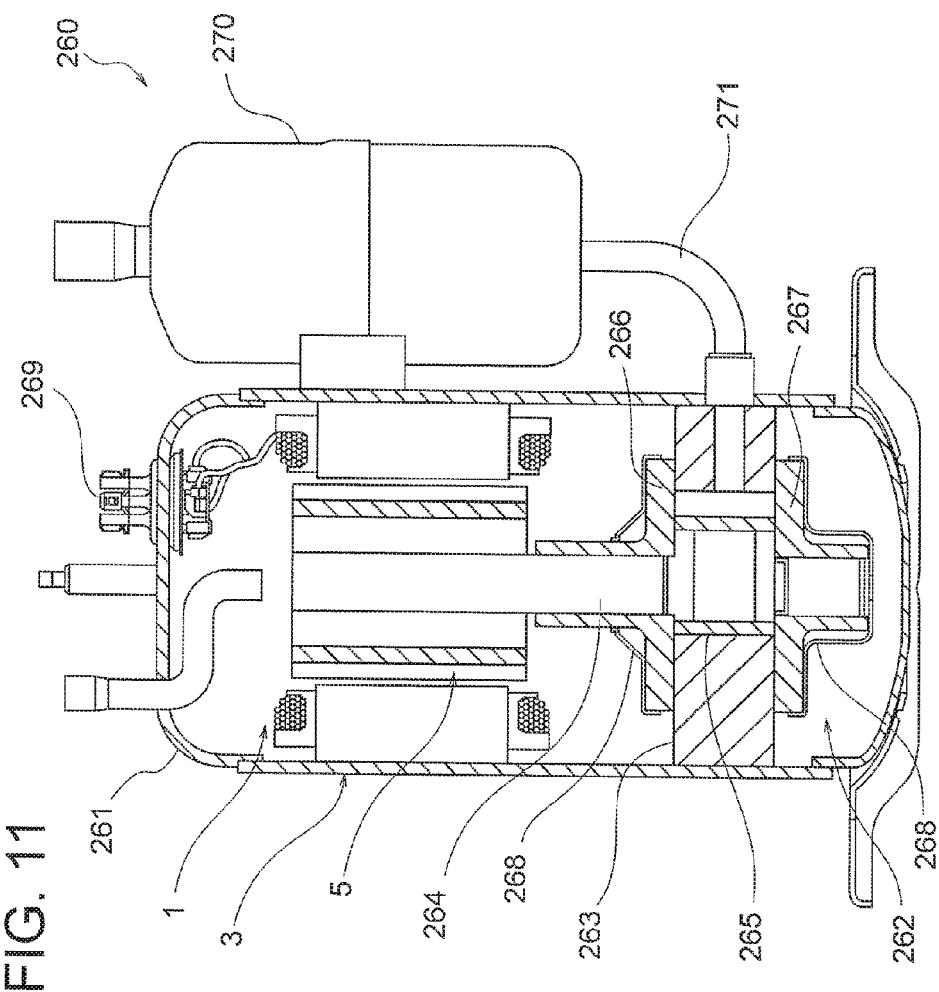
FIG. 11 is a vertical sectional view of a rotary compressor according to a third embodiment of the present invention.

FIG. 11 is a vertical sectional view of the rotary compressor having the interior permanent magnet motor mounted therein. A rotary compressor 260 includes the interior permanent magnet motor (motor element) 1 of the first or second embodiment described above and a compression element 262 in an airtight container 261. Although not illustrated, a refrigerating machine oil for lubricating each of sliding portions of the compression element is stored in a bottom portion of the airtight container 261.

The compression element 262 includes, as main components thereof, a cylinder 263 arranged in a vertically stacked state, a rotary shaft 264 serving as the shaft 13 rotated by the interior permanent magnet motor 1, a piston 265 to be fitted by insertion into the rotary shaft 264, a vane (not shown) dividing an inside of the cylinder 263 into an intake side and a compression side, an upper frame 266 and a lower frame 267 being a pair of upper and lower frames into which the rotary shaft 264 is to be rotatably fitted by insertion and which are configured to close axial end surfaces of the cylinder 263, and mufflers 268 mounted on the upper frame 266 and the lower frame 267, respectively.

The stator 3 of the interior permanent magnet motor 1 is directly fixed to the airtight container 261 by a method such as shrink fitting or welding and is held thereby. A coil of the stator 3 is supplied with power from a glass terminal 269 fixed to the airtight container 261.

The rotor 5 is arranged through intermediation of the air gap 15 on a radially inner side of the stator 3, and is held in a rotatable state by bearing portions (upper frame and lower frame) of the compression element 262 via the rotary shaft 264 in the center portion of the rotor 5.

Next, an operation of the rotary compressor is described. A refrigerant gas supplied from an accumulator 270 is taken into the cylinder 263 through an intake pipe 271 fixed to the airtight container 261. The interior permanent magnet motor 1 is rotated by energization of an inverter so that the piston 265 fitted to the rotary shaft 264 is rotated in the cylinder 263. With this, the refrigerant is compressed in the cylinder 263.

The refrigerant, which has passed through the muffler, rises in the airtight container 261. At this time, the refrigerating machine oil is mixed into the compressed refrigerant. When the mixture of the refrigerant and the refrigerating machine oil passes through air holes formed in the rotor core, the refrigerant and the refrigerating machine oil are promoted to be separated from each other, and hence the refrigerating machine oil can be prevented from flowing into a discharge pipe 272. In this manner, the compressed refrigerant is supplied on a high-pressure side of the refrigeration cycle through the discharge pipe 272 arranged on the airtight container 264.

As the refrigerant for the rotary compressor, R410A, R407C, R22, or the like that has hitherto been used may be used, but any refrigerant such as a refrigerant having a low global warming potential (GWP) may also be applied. In view of the prevention of global warming, a low GWP refrigerant is desirable. As typical examples of the low GWP refrigerant, the following refrigerants are given.

(1) A halogenated hydrocarbon having a carbon double bond in the composition; for example, HFO-1234yf ($CF_3CF=CH_2$) is given. An HFO is an abbreviation of a Hydro-Fluoro-Olefin, and an Olefin is an unsaturated hydrocarbon having one double bond. Note that, a GWP of HFO-1234yf is 4.

(2) A hydrocarbon having a carbon double bond in the composition; for example, R1270 (propylene) is given. Note that, R1270 has a GWP of 3, which is smaller than that of HFO-1234yf, but has higher combustibility than HFO-1234yf.

(3) A mixture containing at least any one of a halogenated hydrocarbon having a carbon double bond in the composition or a hydrocarbon having a carbon double bond in the composition; for example, a mixture of HFO-1234yf and R32 is given. HFO-1234yf, which is a low pressure refrigerant, is large in pressure loss and is thus liable to degrade the performance of the refrigeration cycle (in particular, in an evaporator). Therefore, a mixture of HFO-1234yf and R32 or R41 that is a refrigerant higher in pressure than HFO-1234yf is positively used in practice.

Even in the rotary compressor configured as described above, by using the above-mentioned interior permanent magnet motor, the unbalance in the magnetic flux density on the rotor outer peripheral surface, which is caused by the magnetic flux distribution generated due to the rotating direction during the driving of the motor, can be suppressed to enable the reduction of the vibration while the slits are provided so as to reduce the unbalance in the rotor magnetic attraction force.

Fourth Embodiment

Figure 12:
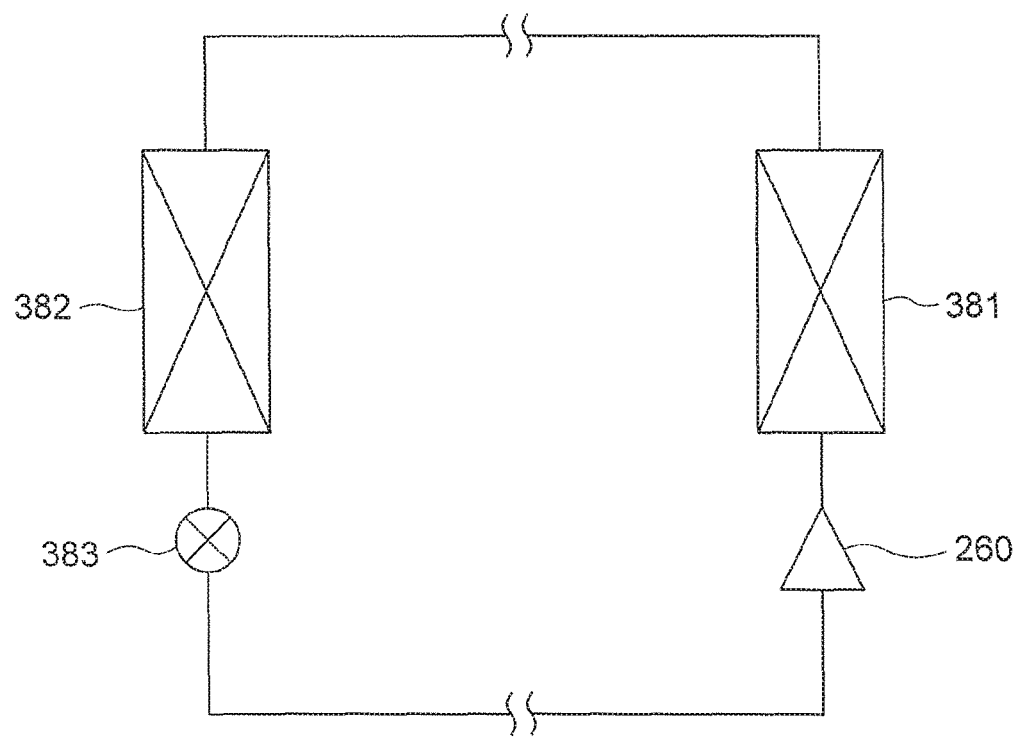
FIG. 12 is a view for illustrating a refrigeration and air conditioning apparatus according to a fourth embodiment of the present invention.

Further, as exemplified in FIG. 12, the present invention may also be carried out as a refrigeration and air conditioning apparatus 380 including the above-mentioned rotary compressor 260 as a component of a refrigeration cycle. The refrigeration cycle of the refrigeration and air conditioning apparatus 380 includes at least a condenser 381, an evaporator 382, and an expansion device 383. However, the configuration of components other than the compressor, including the condenser 381, the evaporator 382, and the expansion device 383, is not particularly limited.

In the above, the details of the present invention are specifically described referring to the preferred embodiments. However, it is apparent to those skilled in the art that various modifications may be made based on the basic technical concept and the teachings of the present invention.

REFERENCE SIGNS LIST

1 interior permanent magnet motor, 3 stator, 5 rotor, 5*a* rotor outer peripheral surface, 11 rotor core, 19 permanent magnet, 21 magnet insertion hole, 31*a* slit, 53 hole inner-side line, 55 hole outer-side line, 55*a* main arc portion, 57 hole side line, 61 concave portion, 260 rotary compressor, 261 airtight container, 380 air conditioning apparatus

The invention claimed is:

1. An interior permanent magnet motor, comprising:
a rotor comprising a permanent magnet; and
a stator,
wherein the rotor further comprises a rotor core,
wherein the rotor core has a magnet insertion hole and a slit,
wherein the permanent magnet is inserted into the magnet insertion hole,
wherein the magnet insertion hole is curved into an arc shape, and a convex portion side of the arc shape is arranged on a center side of the rotor,
wherein the slit is arranged in a region of the rotor core, said region being located on a radially outer side of the magnet insertion hole,
wherein the magnet insertion hole has a first line, a second line, and a pair of third lines,
wherein the first line is located on the radially outer side of the second line,
wherein each of the third lines connects the first line and the second line to each other,
wherein the first line is an outer-side line of the magnet insertion hole and the second line is an inner-side line of the magnet insertion hole,
wherein a first hole arc surface and a pair of concave portions comprise the outer-side line, the pair of concave portions being located on both sides of the first hole arc surface,
wherein each of the concave portions is located only on the outer-side line,
wherein an outer-side contour surface of the permanent magnet is formed by a first magnet arc surface,
wherein an inner-side contour surface of the permanent magnet is formed by a pair of second magnet arc surfaces and a magnet straight surface,
wherein a pair of second hole arc surfaces and a hole straight surface comprise the inner-side line,
wherein the first hole arc surface has a first arc radius and each second hole arc surface has a second arc radius,
wherein the second arc radius is greater than the first arc radius,
wherein the first arc radius and the second arc radius have a common radius center, and
wherein a bottom portion of each of the concave portions is formed into an arc shape and opposes the outer-side contour surface of the permanent magnet.

2. An interior permanent magnet motor according to claim 1,
wherein the slit is formed at a position closer to the third lines than to a magnetic pole center line.

3. An interior permanent magnet motor according to claim 1,
wherein an air gap is formed between the each of the concave portions and the permanent magnet under a state of the permanent magnet being inserted into the magnet insertion hole.

4. An interior permanent magnet motor according to claim 1,
wherein a depth of the each of the concave portions is 30% or smaller of a thickness of the permanent magnet.

5. An interior permanent magnet motor according to claim 1,
wherein the permanent magnet comprises a ferrite magnet or a rare-earth magnet.

6. A compressor, comprising, in an airtight container:
a motor; and
a compression element,
wherein the motor comprises the interior permanent magnet motor of claim 1.

7. A refrigeration and air conditioning apparatus, comprising the compressor of claim 6 as a component of a refrigeration cycle.

8. An interior permanent magnet motor according to claim 1,
wherein the slit has a decreased width radially inward to a center of the rotor core.

* * * * *